United States Patent [19]

Grundmann

[11] Patent Number: 5,149,043
[45] Date of Patent: Sep. 22, 1992

[54] TURNTABLE DEVICE

[76] Inventor: Ernst H. Grundmann, Am Sportplatz 36, 4005 Meerbusch, Fed. Rep. of Germany

[21] Appl. No.: 617,814

[22] Filed: Nov. 26, 1990

[30] Foreign Application Priority Data

May 26, 1990 [DE] Fed. Rep. of Germany ... 9006002[U]

[51] Int. Cl.⁵ .............................................. A47B 91/00
[52] U.S. Cl. .................................... 248/349; 108/20; 108/139; 248/186
[58] Field of Search ............... 248/131, 186, 349, 521, 248/522; 108/20, 103, 139; 312/305

[56] References Cited

U.S. PATENT DOCUMENTS

| 319,743 | 6/1885 | Parker | 248/349 X |
|---|---|---|---|
| 3,063,714 | 11/1962 | Krauss | 248/349 X |
| 4,026,067 | 5/1977 | Wengel | 248/131 X |
| 4,114,541 | 9/1978 | Weddendorf | 108/20 |
| 4,258,966 | 3/1981 | Grubb | 312/305 |
| 4,411,395 | 10/1983 | Steffens . | |
| 4,635,894 | 1/1987 | Sammons | 108/103 X |
| 4,905,543 | 3/1990 | Choi . | |
| 4,946,127 | 8/1990 | Kulaga | 248/186 X |

FOREIGN PATENT DOCUMENTS

| 3246835 | 6/1984 | Fed. Rep. of Germany . | |
| 3410087 | 6/1985 | Fed. Rep. of Germany . | |
| 9002638 | 3/1990 | Fed. Rep. of Germany . | |
| 768591 | 8/1934 | France . | |
| 2008967 | 1/1970 | France . | |
| 159371 | 3/1933 | Switzerland | 248/349 |
| 2171470 | 8/1986 | United Kingdom . | |

*Primary Examiner*—J. Franklin Foss
*Attorney, Agent, or Firm*—Sixbey, Friedman, Leedom & Ferguson

[57] ABSTRACT

A turntable device for audio and/or video units, floodlights, flower pots, showpieces, etc. In particular, the invention relates to a turntable device preferably having a circular base plate placed upon a base, with a circular bearing race extending on the top side of the base plate near its outer periphery. A concentric bearing ring is placed on the bearing race, for example in the form of a ball bearing ring, with a turntable having a circular bearing race extending on its underside near the outer periphery of the turntable. The turntable is concentric with the base plate to allow the turntable to turn about a common center axis. In accordance with a preferred embodiment of the invention the turntable device is also provided with a second bearing arrangement which is coaxially disposed relative to the center axis and near to the common center axis of the various parts. The resultant concentric arrangement bearings includes bearing races arranged on the base plate and on the turntable, with a bearing ring, for example, a ball bearing ring, being located between the races.

17 Claims, 3 Drawing Sheets

TURNTABLE DEVICE

BACKGROUND OF THE INVENTION

The invention relates to a turntable device for audio and/or video units, floodlights, flower pots, showpieces, etc. In particular, the invention relates to a turntable device preferably having a circular base plate placed upon a base, with a circular bearing race extending on the top side of the base plate near its outer periphery. A concentric bearing ring is placed on the bearing race, for example in the form of a ball bearing ring, with a turntable having a circular bearing race extending on its underside near the outer periphery of the turntable. The turntable is mounted concentric with the base plate to allow the turntable to turn about a common center axis.

Various turntable devices of the above-mentioned type have long been known in the art, for example as disclosed in German Auslegeschrift Nos. 3 246 835 & 3 410 087. One such known turntable device, to which the present invention relates, and as disclosed in German Auslegeschrift No. 3 246 835, is limited in strength properties and cannot carry articles of substantial weight. In order to carry articles having larger weight, the material wall thickness, particularly of the base plate and turntable, must be large. Larger thicknesses in turn result in a heavy turntable device, having an associated high cost, since a large amount of plastic or other material must be utilized. Therefore, such a turntable arrangement is expensive and cumbersome. Turntables of this type also suffer from the disadvantage that they must be disassembled for cleaning.

SUMMARY OF THE INVENTION

The primary object of the invention is to provide a turntable device of the above-described type which can carry substantial weight and still be formed in a manner which makes it to be light in weight, and reduces the amount of materials required.

These and other objects are achieved, in accordance with a preferred embodiment of the invention, by providing a turntable device which is provided similar to that discussed above, and which further includes a second arrangement concentric to the center axis and nearer to the common center axis of the various parts. The second, more central, concentric arrangement includes bearing races arranged on the base plate and on the turntable, with a bearing ring, for example, a ball bearing ring, being located between the races.

It is to be understood that in the turntable device according to the present invention, the ball bearing ring can be formed as a single piece, with one of the two bearing races. However, with an arrangement in which the bearing rings are not separate, the turning properties are not as optimal, and in accordance with a further feature of the present invention, separate ball bearing rings are therefore provided. Furthermore, it is to be understood that while a ball bearing ring is disclosed, in a preferred embodiment of the bearing ring, roller bearings or even friction bearings, as is known in the art, may also be utilized.

In accordance with one aspect of the invention, in lieu of the use of one bearing ring as utilized in the prior art with correspondingly allocated races, in the present invention, two bearing rings are utilized which are spaced at a radial distance from one another, with correspondingly allocated races provided. While this twofold support of the turntable on the base plate, concentric to the center axis but at varying distances from the center axis, may be more expensive in terms of the support, it simultaneously allows for manufacture of the device utilizing material thicknesses in the base plate and, more importantly, the turntable, which are drastically reduced. In addition, the high bending moments occurring in the prior art as the result of bridging of large radial distances, causing a tilting tendency, are completely eliminated. With the improved load-carrying capacity, the turntable device according to the present invention can consequently be formed in a very light and material conserving manner.

Other aspects and advantages of the present invention are also realized in accordance with the features of various configurations and embodiments incorporating the basic concept of the invention. For example, in accordance with one aspect, the turntable is formed, in top view, polygonally, preferably with an even number of corners, and in particular hexagonally. In contrast to turntable devices known in the prior art which are typically round, a polygonal turntable results in the minimal width being determined by the outer diameter of the circular base plate, while the maximum width is determined by the diagonal between two opposite corners. Thus, such a turntable device can easily be stored in a cabinet using the minimum width, while the maximum width of the turntable from corner to corner can be utilized when supporting objects upon the turntable device. Other objects and advantages of the present invention will be apparent from the following detailed discussion of the preferred embodiments read in conjunction with the drawings.

DETAILED DESCRIPTION OF THE PREFERRED EMBODIMENTS

Figure 1:
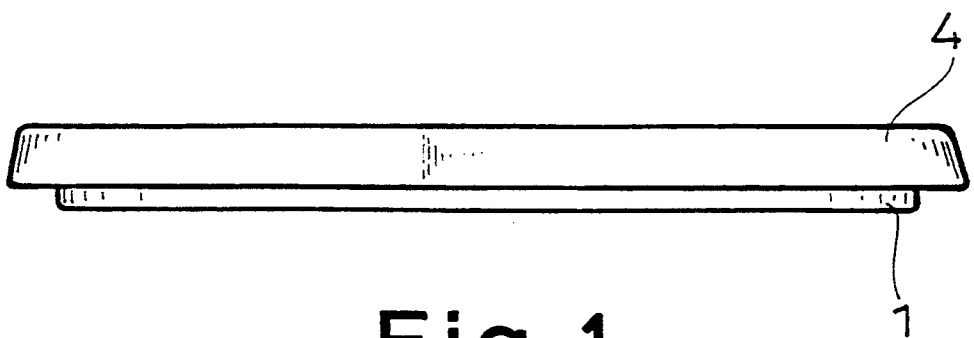
FIG. 1 shows a turntable device according to the invention in a side view.

The invention will now be described in conjunction with the drawings. The drawings show a turntable device which is intended and suited for use in supporting audio and/or video units, floodlights, flower pots, show pieces, etc. In the embodiment represented, the turntable device has a structural height of about 20 mm, a minimum width of approximately 250 mm, a maximum width of approximately 290 mm and a load carrying capacity of up to 100 kp. However, the invention is not to be limited to a particular size, as would be readily understood by those skilled in the art.

The turntable device represented has a preferably circular base plate 1 which is placed on a base or other supporting surface. Base plate 1 has a circular bearing race 2 extending on its top side near the outer periphery thereof. FIG. 5 shows an especially enlarged section of the area of bearing race 2 on base plate 1. A bearing ring, which in the preferred embodiment is in the form of a ball bearing ring 3, is placed on race 2. Further, a turntable 4 having a circular bearing race 5 extending on its underside near the outer periphery thereof is located coaxially with respect to base plate 1 and, can turn relative to base plate 1 around a common center axis as is apparent from FIG. 4.

As is known in the art, the various parts are preferably formed of plastic that can be injection molded, so that they can be both relatively light and economically manufactured. The balls of ball bearing ring 3 consist in most cases of steel. Instead of ball bearing ring 3, roller bearing rings can also be provided. Further, as mentioned previously, the ball bearing ring 3 could be integrated with one of the two races, 2,5, as is contemplated within the scope of the present invention, however, the turning capacity may be correspondingly degraded.

Figure 3:
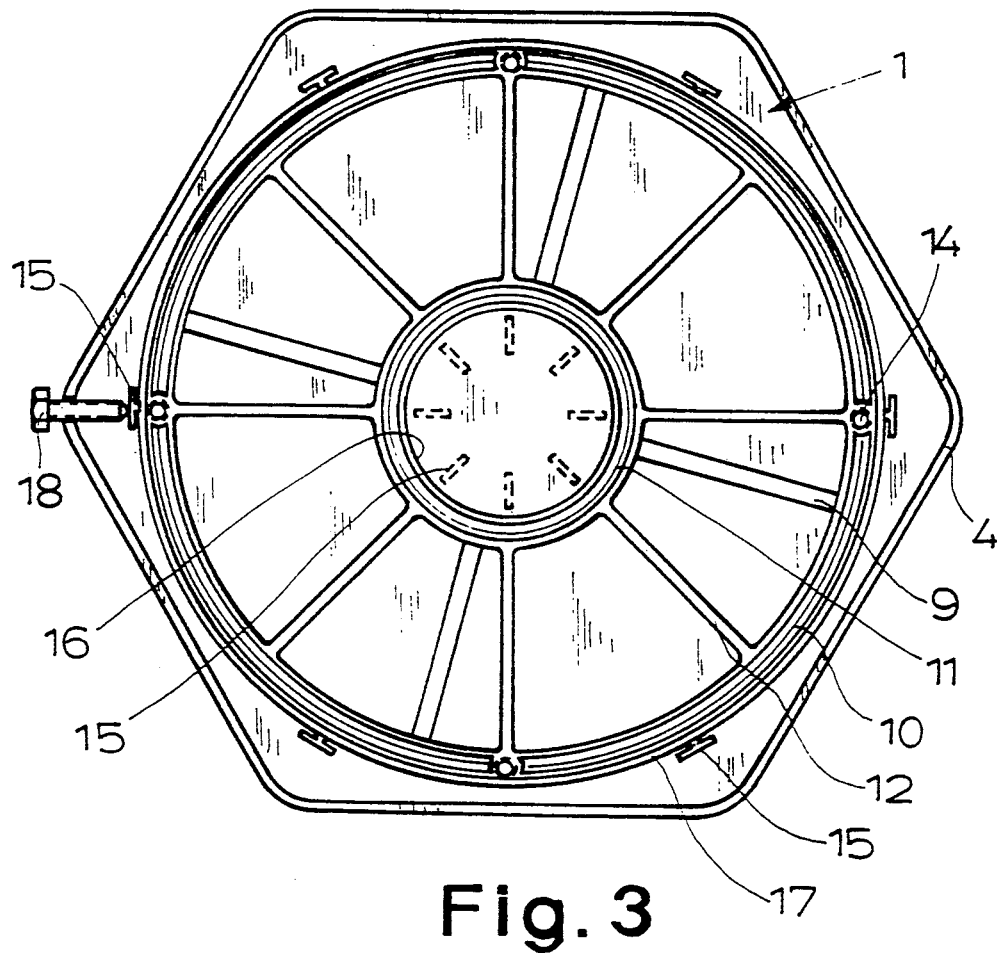
FIG. 3 shows a bottom view of the FIG. 1 turntable device.
Figure 4:
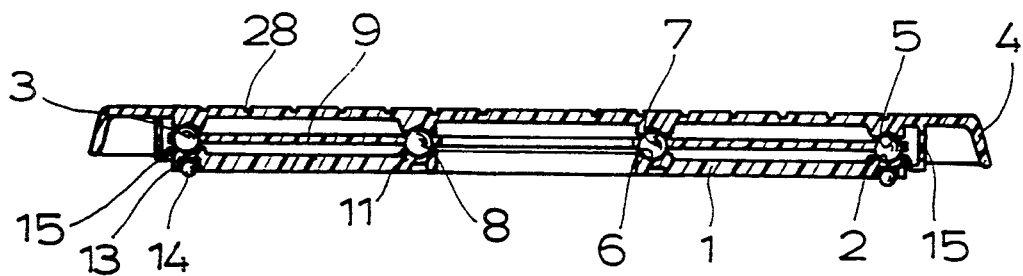
FIG. 4 is a sectional view of the turntable device of FIG. 1 positioned as in FIG. 1.
Figure 5:
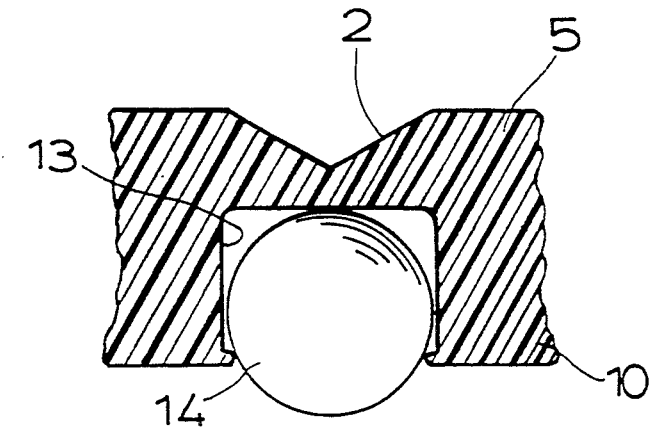
FIG. 5 illustrates a part of the section of the turntable device shown in FIG. 4.

As can be seen in FIGS. 3 and 4, according to the present invention, near the common center axis of the various parts is provided a second bearing arrangement coaxial with respect to the center axis. The second arrangement includes bearing races 6,7 placed on the base plate 1 and on turntable 4, respectively, and further, a bearing ring placed between the races in the form of a ball bearing ring 8. The double concentric bearing arrangement of turntable 4 that is achieved by the design according to the present invention allows the material thickness of turntable 4 to be kept very small, since the spans or distances between the races 2,5; 6,7 are relatively small, as can be seen in FIG. 4. Further, it should be apparent that, here, the danger of tipping the arrangement due to high tipping moments is very small.

In the turntable device according to the invention, two ball bearing rings 8 or other types of bearing rings are necessary. For reasons relating to assembly and handling, these can be assembled into one unit by connecting them to one another by webs 9 extending essentially radially, with four webs 9 provided according to the preferred embodiment. Webs 9 are provided at very little additional material expense, and one overall unit is formed such that both ball bearing rings 3,8 and webs 9 can be handled as a single unit. In addition, this arrangement contributes to a structural stabilization of the overall design.

In accordance with the above-described design, with an optionally continuous base plate 1, an easy method of construction in a material conserving embodiment is achieved, with the device having a high load carrying capacity. However, in accordance with the present invention, it has been further recognized that the arrangement can be further enhanced, namely by making base plate 1 of two circular, concentric retaining rings 10,11 at a considerable radial distance from one another, with each retaining ring 10,11 having a bearing race 2,6. As explained above, for ball bearing rings 3,8, here also retaining rings 10,11 can be combined with one another into a one-piece unit, for example, by essentially radially extending webs. Base plate 1 is thus formed by the connection of retaining rings 10,11 and webs 12. It is particularly recommended for stability reasons to provide six or eight webs 12. The basis for this configuration of the present invention is the recognition that a sturdy embodiment of base plate 1, which is thus able to carry substantial weight, is necessary only in the area of races 2,6, while, at all other points, base plate 1 actually has no function. Consequently, material of base plate 1 has been dispensed with as much as possible at the other portions. Webs 12 connecting retaining rings 10,11 are suitable for handling the parts forming base plate 1 as a unit.

Another configuration which is suitable for production reasons, and which conserves material includes providing retaining ring 10 or 11 made in a cross section as a hollow section, and in particular as a U section or a V section, opening downwardly and closed upwardly, thereby forming race 2 or 6. In the embodiment represented, as can be seen particularly in FIG. 3, both retaining rings 10,11 are made correspondingly of a hollow section. Despite the small material expense, the hollow section is completely sufficient in bending strength.

FIGS. 3, 4 and 5, combined, further show that at least outer retaining ring 10 is provided on its underside with several receiving chambers 13 distributed on the periphery for housing bearings 14 made of a highly flexible material. Inner retaining ring 11 could also be provided with similar chambers 13 for housing bearings 14, however, here fewer are needed, as will become apparent from the following description.

A bearing 14 of a highly flexible material, in particular, in the form of a rubber ball, as represented in FIG. 5, can be pushed into a correspondingly undercut receiving chamber 13 as represented in FIG. 5, to prevent the bearing from falling out of the receiving chamber. The bearing prevents scratching of delicate table tops when the turntable device is set down and shifted. In addition, the bearing simultaneously results in a turntable device which does not easily slip laterally, even during operation.

The represented design of receiving chamber 13 and bearing 14 is also advantageous in that the receiving depth of bearings 14 and receiving chambers 13 makes it possible to elastically push bearing 14 into receiving chambers 13 when a certain critical load of turntable 4 is exceeded. These design features are based on the recognition that a shifting of the turntable device, and thus the scratching of a delicate table top, occurs mainly at the beginning, i.e., when the turntable device is not loaded. If the turntable device is first loaded at its intended location, it generally will not be shifted laterally thereafter. As a result, it does not matter if, with a high dead load, the entire edge of retaining ring 10 lies on the base without having particularly high degree of flexibility and a way to protect against scratches. Thus, if needed, an automatically enlarging support base is provided for retaining ring 10 on the base. For this reason, providing corresponding houses bearing 14 for inner retaining ring 11 is less essential.

FIGS. 4 and 5 show that races 2,6, in the design according to the present invention, are formed three dimensionally, namely, they are configured as triangles in cross section. Other possible design shapes may include trapezoidal or, as in the prior art, spherically rounded. However, to avoid geometric redundancies, the load transmission areas should always lead to a linear load to the extent possible.

The represented turntable device according to the present invention further includes features for preventing lateral mutual shifting of the parts. In this regard, a certain small radial play is always necessary to guarantee that turntable 4 can turn easily relative to base plate 1. First, in FIG. 3, for this purpose, catches 15 are provided which project axially inward from turntable 4 through a corresponding opening in base plate 1, namely through the open inner periphery of retaining ring 11. This arrangement is known in and of itself in the prior art, and is representatively shown by dashed lines in FIG. 3 as a possible solution.

In the embodiment shown in FIGS. 3 and 4, as represented in solid lines, catches 15 are placed on the outer periphery of outer race 2. In doing so, the embodiment represented here, and thus preferred, catches 15 are further made as elastic latching elements which axially engage, from behind, counter elements correspondingly placed on the other part, which in the preferred embodiment takes the form of an encircling latching strip 17. Here, there is also a limited play, however, in the axial direction such that there is no impairment in the ability of turntable 4 to turn relative to base plate 1. If in doing so, the axial play is less than the effective running depth of races 2,5; 6,7 formed three-dimensionally, then it is guaranteed that even when turntable 4 is lifted, ball bearing rings 3,8 cannot slip laterally. Catches 15 and/or latching strip 17 can also be provided with beveled stopping surfaces facing one another, such that simply by pushing latching strip 17 into the circular mounting formed on turntable 4 by catches 15, the base plate 1 can be latched radially and axially with turntable 4. As would be readily understood, of course the allocation of the catches 15 and the latching strip 17 can also be reversed. Similarly, catches 15 in the form of elastic latching elements can also be entirely placed on the inner periphery of inner retaining ring 11, on its outer periphery, or on the inner periphery of outer retaining ring 10.

FIG. 3 illustrates another preferred embodiment which is configured so that the turning of turntable 4 can be blocked relative to base plate 1, and additionally so that the catch 15, formed as an elastic latching element, can preferably be pressed against latching strip 17. For this purpose, a blocking screw 18, screwed in laterally from the outside, is shown in the embodiment represented; however, an eccentric lever or a simple wedge shim could also be utilized. All elements acting to block rotation could also engage retaining ring 10 directly. A blocking pin could also be utilized to catch base plate 1 from the top side of turntable 4, however, such a pin could collide with objects to be placed on the turntable 4.

It is apparent that the turntable device according to the present invention is a design which is flawless in all aspects and oriented toward accommodating the highest load capacities with the lowest possible amount of material and design weight, the design is consequently extraordinarily economical to produce. Here, the design is very reliable, and further provides an elegant design which is easy to clean. The arrangement is easy to clean particularly due to the open configuration of base plate 1 and of the unit of ball bearing rings 3,8 which makes it possible to reach even the underside of turntable 4 without disassembling base plate 1.

Figure 6:
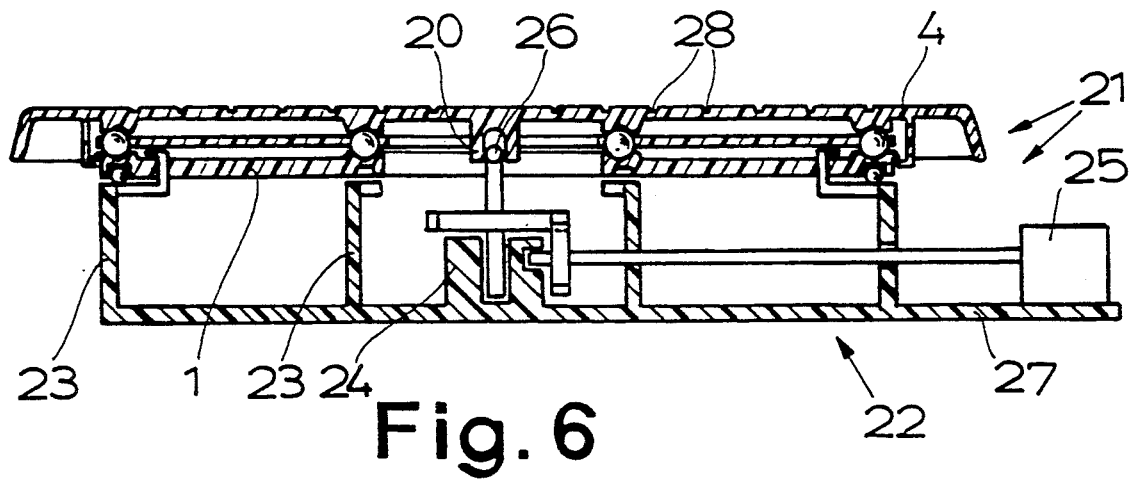
FIG. 6 is a representation, corresponding to FIG. 4, of an embodiment of a turntable device that is equipped with a motor drive.

FIG. 6 shows an alternate embodiment of a turntable device according to the invention which is distinguished in that the turntable includes a coupling attachment 20 for a motor drive 21. According to the present invention, it has been recognized that a turntable device of this type has a special form and use when turntable 4 is motorized. Such an embodiment can be particularly desirable in shows or demonstrations. The embodiment represented in FIG. 6 is distinguished in this regard in that motor drive 21 includes a base 22 having encircling support rings 23 for base plate 1, with a gear bearing 24 or an electric drive motor 25 placed in base 22 or next to base 22. The embodiment represented is further distinguished in that coupling attachment 20 can automatically be coupled with a drive element 26 placed in base 22 as the unit made up of base plate 1 and turntable 4 is set down on the base. Also, for the configuration of base 22 with support rings 23, the construction provided preserves as much material as possible with support rings 23 located only where it is absolutely necessary and likewise with a base plate 27 formed as a double ring with connecting webs.

Of particular importance, in accordance with further inventive features, is the design of turntable 4 of the turntable device. The turntable is, as shown in FIG. 1, polygonal in top view and specifically with an even number of corners which, as shown in the preferred embodiment, is hexagonal. This arrangement has the advantage in that the diagonal distance of the center points of the respective opposite edges defines a minimal width of turntable 4 that structurally need not be larger than the outer periphery of circular base plate 1. With this minimal width, the turntable device can be stored in a cabinet, in a space-saving way. There, the width is generally the actual problem, since generally there is enough space in depth and objects are placed one behind the other in a cupboard only reluctantly. However, turntable 4 of the turntable device according to the invention provides an effective maximum width for an object to be placed on it, namely, the diagonal distance between two opposite corners of the turntable. This feature provides usable dimensions which are substantially greater than those of the prior art, while providing more manageable storage dimensions.

In the above-explained polygonal configuration of turntable 4, space is further gained in the corners to arrange catches 15 on the outer periphery of the outer race without detracting from the minimum width of the turntable 4. In a similar manner, an odd number of corners is also advantageous, even if the width ratio is somewhat poorer than with an even number of corners.

Figure 2:
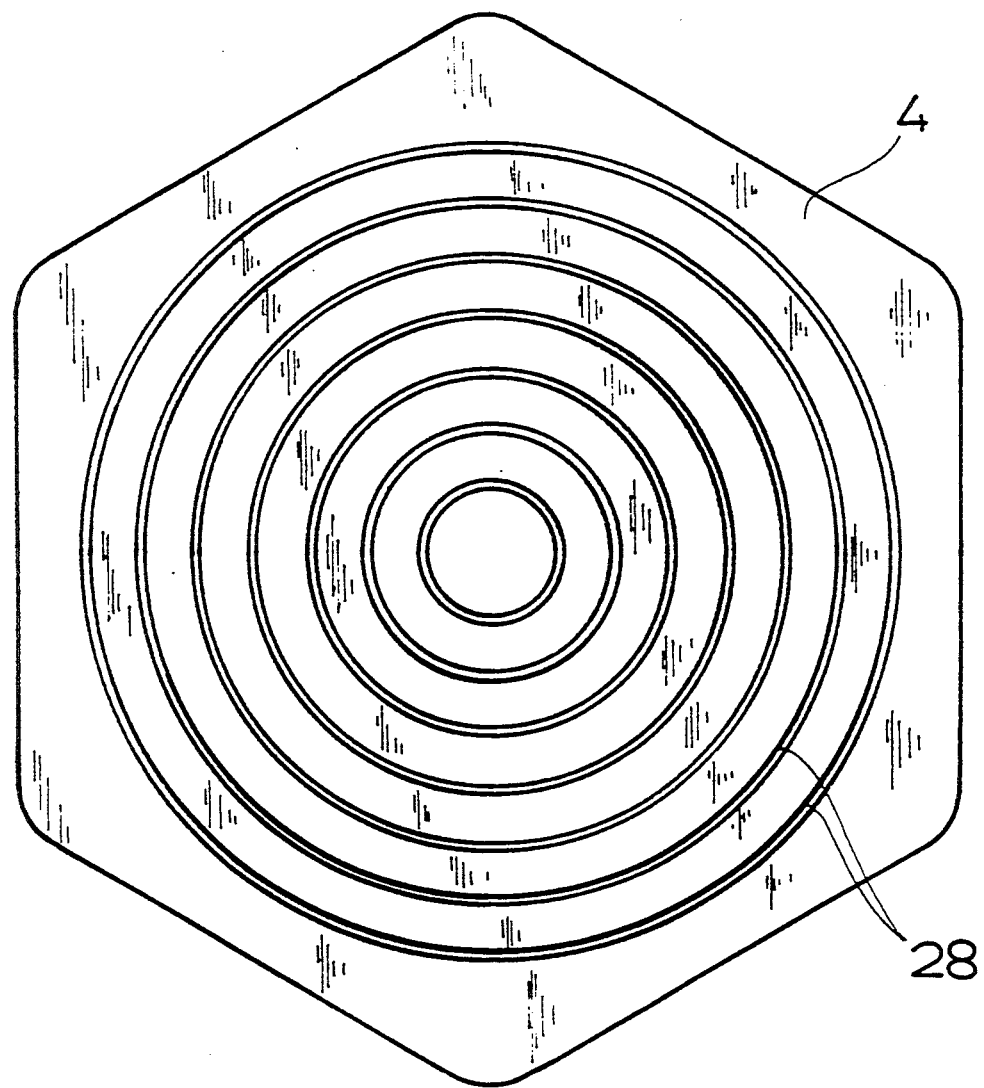
FIG. 2 is a top view of the turntable device of FIG. 1.

Finally, FIG. 2 also shows concentric grooves 28 embedded in the top side of turntable 4. These grooves 28 serve to receive dripping water, and simultaneously to prevent slipping of objects placed on turntable 4. The grooves can also improve the decorative appearance, but more importantly, further save material by structurally stiffening the turntable 4.

While various forms of the present invention have been described, it is to be understood that various modifications are also possible within the scope of the present invention.

What is claimed:

1. A turntable device for supporting items including any one audio units, video units, floodlights, flower pots, and showpieces, the device comprising:

a base plate, for supporting the turntable on a base, the base plate having a circular bearing race extending at a top side near an outer periphery of the base plate;

a first concentric bearing ring mounted on the bearing race of the base plate; and a turntable mounted coaxially upon the base plate for rotation about a common center axis, the turntable having a circular bearing race extending at an under side near an outer periphery of the turntable;

wherein a second bearing race is provided on the base plate and the turntable, a second bearing ring being provided between the respective second bearing races of the base plate and turntable; wherein the base plate includes two circular concentric retaining rings radially spaced from one another, each having a respective one of the first-mentioned and second bearing races; and wherein the retaining rings are assembled into a unit by substantially radially extending webs.

2. The turntable device of claim 1, wherein the first and second bearing rings are ball bearing rings.

3. The turntable device of claim 1, wherein the base plate and turntable are formed of injection molded plastic.

4. The turntable device of claim 2, wherein at least one of the retaining rings is formed having a cross section in the form of one of a hollow U- and a V-shaped cross section which is closed at an upper portion, and has a downwardly open lower section which forms a bearing race.

5. A turntable device according to claim 1, wherein at least an outer one of the retaining rings includes a plurality of receiving chambers at an underside of at least the outer retaining ring, said chambers being distributed peripherally about the retaining ring for housing bearings formed of a highly flexible material.

6. The turntable device according to claim 5, wherein a receiving depth of the bearings in the receiving chambers allows for the bearings to be elastically pushed into the receiving chambers when a predetermined critical load of the turntable is exceeded.

7. The turntable device according to claim 2, wherein the ball bearing rings are connected as a unit by a plurality of substantially radially extending webs.

8. The turntable device of claim 1, wherein catches are provided on one of the turntable and base plate, with the catches projecting axially through a corresponding opening in the other of the turntable and base plate, the catches preventing mutual lateral shifting of the parts.

9. The turntable device of claim 8, wherein the catches are located on an outer periphery of an outer race of one of the turntable and base plate.

10. wherein a turntable device for supporting items including any one audio units, video units, floodlights, flower pots, and showpieces, the device comprising:
a base plate, for supporting the turntable on a base, the base plate having a circular bearing race extending at a top side near an outer periphery of the base plate;
a first concentric bearing ring mounted on the bearing race of the base plate; and
a turntable, mounted coaxially upon the base plate for rotation about a common center axis, the turntable having a circular bearing race extending at an under side near an outer periphery of the turntable;
wherein a second bearing race is provided on the base plate and the turntable, a second bearing ring being provided between the respective second bearing races of the base plate and turntable;
wherein catches are provided on one of the turntable and base plate, with the catches projecting axially through a corresponding opening in the other of the turntable and base plate, the catches preventing mutual lateral shifting of the parts;
wherein the catches are located on an outer periphery of an outer race of one of the turntable and base plate; and
wherein the catches are elastic latching elements which axially engage, from behind counterelements in the form of an encircling strip formed on the other of the turntable and base plate.

11. The turntable device of claim 10, wherein the catches formed of elastic latching elements engage in and from behind the latching strip with little axial play.

12. The turntable device according to claim 11, wherein the axial play is smaller than an effective running depth of the bearing races.

13. A turntable device for supporting items including any one audio units, video units, floodlights, flower ports, and showpieces, the device comprising:
a base plate, for supporting the turntable on a base, the base plate having a circular bearing race extending at a top side near an outer periphery of the base plate;
a first concentric bearing ring mounted on the bearing race of the base plate; and
a turntable mounted coaxially upon the base plate for rotation about a common center axis, the turntable having a circular bearing race extending at an under side near an outer periphery of the turntable;
wherein a second bearing race is provided on the base plate and the turntable, a second bearing ring being provided between the respective second bearing races of the base plate and turntable; and
wherein a means for blocking rotation of the turntable relative to the base plate that includes a catch formed as an elastic latching element which can be pressed against a latching strip.

14. The turntable device of claim 1, wherein the bearing rings are connected as a unit by a plurality of substantially radially extending webs.

15. A turntable device for supporting items including any one audio units, video units, floodlights, flower ports, and showpieces, the device comprising:
a base plate, for supporting the turntable on a base, the base plate having a circular bearing race extending at a top side near an outer periphery of the base plate;
a first concentric bearing ring mounted on the bearing race of the base plate; and
a turntable mounted coaxially upon the base plate for rotation about a common center axis, the turntable having a circular bearing race extending at. an under side near an outer periphery of the turntable;
wherein a second bearing race is provided on the base plate and the turntable, a second bearing ring being provided between the respective second bearing races of the base plate and turntable;
wherein the first and second bearing rings are ball bearing rings;
wherein the base plate includes two circular concentric retaining rings radially spaced from one another, each having a respective one of the first-mentioned and second bearing races; and
wherein at least one of the retaining rings is formed having a cross section in the form of one of a hollow U- and a V which is closed at an upper portion, and has a downwardly open lower section which forms a bearing race.

16. A turntable device for supporting items including any one audio units, video units, floodlights, flower pots, and showpieces, the device comprising:
a base plate, for supporting the turntable on a base, the base plate having a circular bearing race extending at a top side near an outer periphery of the base plate;

a first concentric bearing ring mounted on the bearing race of the base plate; and a turntable mounted coaxially upon the base plate for rotation about a common center axis, the turntable having a circular bearing race extending at an under side near an outer periphery of the turntable;

wherein a second bearing race is provided on the base plate and the turntable, a second bearing ring being provided between the respective second bearing races of the base plate and turntable;

wherein the base plate includes two circular concentric retaining rings radially spaced from one another, each having a respective one of the first-mentioned and second bearing races; and wherein at least an outer one of the retaining rings includes a plurality of receiving chambers at an underside of at least the outer retaining ring, said chambers being distributed peripherally about the retaining ring for housing bearings formed of a highly flexible material.

17. The turntable device according to claim 15, wherein a receiving depth of the bearings in the receiving chambers allows for the bearings to be elastically pushed into the receiving chambers when a predetermined critical load of the turntable is exceeded.

* * * * *